(12) United States Patent
Kim et al.

(10) Patent No.: US 9,137,060 B2
(45) Date of Patent: Sep. 15, 2015

(54) METHOD OF CANCELLING INTER-SUBCARRIER INTERFERENCE IN DISTRIBUTED ANTENNA SYSTEM AND APPARATUS FOR PERFORMING THE SAME

(71) Applicants: POSTECH ACADEMY-INDUSTRY FOUNDATION, Pohang-si, Gyeongsangbuk-do (KR); INDUSTRY-ACADEMIC COOPERATION FOUNDATION, YEUNGNAM UNIVERSITY, Gyeongsan-si, Gyeongsangbuk-do (KR)

(72) Inventors: Bong Seok Kim, Pohang-si (KR); Kwon Hue Choi, Pohang-si (KR)

(73) Assignees: POSTECH ACADEMY—INDUSTRY FOUNDATION, Pohang-si, Gyeongsangbuk-do (KR); INDUSTRY-ACADEMIC COOPERATION FOUNDATION, YEUNGNAM UNIVERSITY, Gyeongsan-si, Gyeongsangbuk-do (KR)

( * ) Notice: Subject to any disclaimer, the term of this patent is extended or adjusted under 35 U.S.C. 154(b) by 0 days.

(21) Appl. No.: 14/553,096

(22) Filed: Nov. 25, 2014

(65) Prior Publication Data
US 2015/0146828 A1 May 28, 2015

(30) Foreign Application Priority Data
Nov. 26, 2013 (KR) .................. 10-2013-0144412

(51) Int. Cl.
*H04L 27/06* (2006.01)
*H03D 1/06* (2006.01)
*H04L 25/08* (2006.01)
*H04L 27/26* (2006.01)
*H04L 1/06* (2006.01)
(Continued)

(52) U.S. Cl.
CPC .............. *H04L 25/08* (2013.01); *H04L 1/0054* (2013.01); *H04L 1/0668* (2013.01); *H04L 25/0204* (2013.01); *H04L 27/2647* (2013.01); *H04L 27/2659* (2013.01)

(58) Field of Classification Search
CPC .............. H04L 5/0023; H04L 25/0204; H04L 27/2647; H04L 2025/03414; H04L 1/0618; H04L 1/06; H04L 27/2601; H04L 1/0631; H04L 25/03821; H04L 1/0668; H04L 2025/03426; H04B 7/0452; H04B 7/0413; H04B 52/42
USPC .................................................. 375/341, 348
See application file for complete search history.

(56) References Cited

U.S. PATENT DOCUMENTS

2005/0152267 A1   7/2005  Song et al.
2007/0104283 A1*  5/2007  Han et al. ...................... 375/260
(Continued)

FOREIGN PATENT DOCUMENTS

KR   20080059407 A   6/2008
KR   20100049909 A   5/2010

*Primary Examiner* — Don N Vo
(74) *Attorney, Agent, or Firm* — Ladas & Parry LLP (57) ABSTRACT

Disclosed are a method of cancelling inter-subcarrier interference in a distributed antenna system, and a device for performing the same. The method of cancelling the interference performed in a receiver includes: generating a first signal and a second signal by performing a fast Fourier transform (FFT) operation on a received signal received from a first transmission antenna and a second transmission antenna; acquiring first symbols by combining the first signal and the second signal; generating a first interference signal and a second interference signal based on the first symbols; generating a third signal by cancelling the first interference signal from the first signal, and generating a fourth signal by cancelling the second interference signal from the second signal; and acquiring second symbols by combining the third signal and the fourth signal.

16 Claims, 7 Drawing Sheets

(51) Int. Cl.
  *H04L 1/00* (2006.01)
  *H04L 25/02* (2006.01)

(56) References Cited

U.S. PATENT DOCUMENTS

| | | |
|---|---|---|
| 2007/0217323 A1 | 9/2007 | Ko et al. |
| 2007/0217529 A1 | 9/2007 | Ko et al. |
| 2008/0144749 A1 | 6/2008 | Wilhelmsson et al. |
| 2009/0175366 A1 | 7/2009 | Maltsev et al. |
| 2009/0219977 A1* | 9/2009 | Iwamatsu .............. 375/148 |
| 2011/0090893 A1* | 4/2011 | Higuchi et al. .......... 370/342 |
| 2013/0089009 A1* | 4/2013 | Li et al. ................. 370/278 |
| 2013/0343473 A1* | 12/2013 | Eliaz et al. ............. 375/260 |
| 2014/0133413 A1 | 5/2014 | Kim et al. |

* cited by examiner

METHOD OF CANCELLING INTER-SUBCARRIER INTERFERENCE IN DISTRIBUTED ANTENNA SYSTEM AND APPARATUS FOR PERFORMING THE SAME

CLAIM FOR PRIORITY

This application claims priority to Korean Patent Application No. 10-2013-0144412 filed on Nov. 26, 2013 in the Korean Intellectual Property Office (KIPO), the entire contents of which are hereby incorporated by reference.

BACKGROUND

1. Technical Field

Example embodiments of the present invention relate in general to technology of cancelling interference of a wireless communication system, and more particularly, to a method of cancelling inter-subcarrier interference in a distributed antenna system capable of effectively cancelling inter-subcarrier interference in a frequency selective fading environment, and an apparatus for performing the same.

2. Related Art

According to rapid developments of a wireless communication system, demands for transmitting and receiving massive information at high speed are being increased. In order to satisfy the demands, a method of additionally installing a plurality of distributed antennas in conventional cell coverage and performing cooperative communication among a plurality of transmitters and receivers which are geographically distributed is being used.

The distributed antenna system can eliminate a shade area, reduce transmission power, and improve characteristics of bandwidth versus transmission efficiency, and particularly, a system using a relay node connected to a base station through an optical cable as an distributed antenna has advantages in resource allocation of high efficiency and cooperative signal transmission between distributed antennas since an additional wireless resource is not required for transmitting and receiving a control signal.

Meanwhile, according to developments of semiconductor technology, it is possible to transmit by converting high speed data into low speed data as it is possible to implement a circuit for processing a lot of subcarriers in one integrated circuit. As a calculation is more simplified by using fast Fourier transform (FFT) signal processing technology, an orthogonal frequency division multiplexing (OFDM) method is being used in various commercial wireless and mobile communication systems.

The wireless communication methods using the OFDM transmit a signal using flat channel characteristics even in a wireless environment having frequency selective fading channel characteristics by using multiple subcarriers. Efficiency of bandwidth and a data transmission rate can be improved by using the OFDM characteristics, a modulation and demodulation method can be flexibly applied according to a state of each of a plurality of channels, and data resources which are separated can be multiplexed.

However, since the OFDM uses orthogonal characteristics among a plurality of subcarriers, the OFDM has very sensitive characteristics in inter-subcarrier synchronization. Particularly, in the wireless communication environment using a plurality of transmission points (or nodes) such as the distributed antenna system or the cooperative communication system, there is a problem in which performance is severely degraded when there is an error in the inter-subcarrier synchronization.

On the other hand, recently, use of an Alamouti coded OFGM method which obtains a transmission antenna diversity gain using an Alamouti code has been considered for the distributed antenna system. In order to maximize the diversity gain in the distributed antenna system, the inter-subcarrier interference generated due to a frequency error has to be decreased.

In order to satisfy the requirements described above, studies for reducing the inter-subcarrier interference in the wireless communication system using the OFDM are in progress. However, there is a problem in which performance is degraded when applied to the frequency selective fading channel environment since the studies for reducing the inter-subcarrier interference which are currently in progress have a premise of the wireless channel environment having flat fading characteristics.

SUMMARY

Accordingly, example embodiments of the present invention are provided to substantially obviate one or more problems due to limitations and disadvantages of the related art.

Example embodiments of the present invention provide a method of cancelling inter-subcarrier interference in a wireless communication system capable of effectively cancelling inter-subcarrier interference in a frequency selective fading channel environment.

Example embodiments of the present invention also provide a device of cancelling interference capable of performing the method of cancelling the inter-subcarrier interference.

In some example embodiments, a method of cancelling inter-subcarrier interference, includes: generating a first signal and a second signal by performing a fast Fourier transform (FFT) operation on a received signal received from a first transmission antenna and a second transmission antenna; acquiring first symbols by combining the first signal and the second signal; generating a first interference signal and a second interference signal based on the first symbols; generating a third signal by cancelling the first interference signal from the first signal, and generating a fourth signal by cancelling the second interference signal from the second signal; and acquiring second symbols by combining the third signal and the fourth signal.

Here, when each of the first transmission antenna and the second transmission antenna divides available all subcarriers into a plurality of subcarrier subblocks, the received signal is constituted as a pair of Alamouti code symbols generated by mapping input symbols to subcarriers included in each of the plurality of subblocks.

Here, the method of cancelling the inter-subcarrier interference may further include: evaluating reliability with respect to the second symbols; and acquiring third symbols by performing a maximum likelihood detection operation on a symbol in which the evaluated reliability is lower than a predetermined reference.

Here, the evaluating of the reliability with respect to the second symbols may include evaluating the reliability based on a result obtained by comparing a ratio of average power of all the second symbols and power of each symbol included in the second symbols with a predetermined threshold value.

Here, the method of cancelling the inter-subcarrier interference may further include: generating a third interference signal and a fourth interference signal based on the third symbols; generating a fifth signal by cancelling the third interference signal from the first signal, and generating a sixth signal by cancelling the fourth interference signal from the second signal; and acquiring fourth symbols by combining the fifth signal and the sixth signal.

Here, the generating of the first signal and the second signal may generate the first signal by synchronizing the received signal with a subcarrier frequency of the first transmission antenna, and generate the second signal by synchronizing the received signal with a subcarrier frequency of the second transmission antenna.

Here, the generating of the first interference signal and the second interference signal may include generating the first interference signal and the second interference signal using a first estimation symbol and a second estimation symbol generated based on the first symbols, first channel information and second channel information which are channel information between the receiver and the first transmission antenna, and the receiver and the second transmission antenna, and frequency error information.

In other example embodiments, a receiver, includes: a FFT unit configured to perform a FFT operation on a received signal received from a first transmission antenna and a second transmission antenna, and generate a first signal and a second signal; a calculation unit configured to provide the first signal and the second signal; a combining unit configured to detect first symbols by combining the first and the second signals; an interference signal generation unit configured to generate the first interference signal and the second interference signal based on the first symbols, wherein the calculation unit generates a third signal and a fourth signal by cancelling the first interference signal and the second interference signal from the first signal and the second signal, respectively, and the combining unit detects second symbols by combining the third signal and the fourth signal.

Here, when each of the first transmission antenna and the second transmission antenna divides available all subcarriers into a plurality of subcarrier subblocks, the received signal is constituted as a pair of Alamouti code symbols generated by mapping input symbols to subcarriers included in the each of the plurality of subblocks.

Here, the receiver may further include: a reliability detection unit configured to evaluate reliability with respect to the second symbols; and a maximum likelihood detection unit configured to detect third symbols by performing a maximum likelihood detection operation on a symbol in which the evaluated reliability is lower than a predetermined reference.

Here, the reliability detection unit may evaluate the reliability based on a result obtained by comparing a ratio of average power of all the second symbols and power of each symbol included in the second symbols with a predetermined threshold value.

Here, the interference signal generation unit may generate a third interference signal and a fourth interference signal based on the third symbols, the calculation unit may generate a fifth signal by cancelling the third interference signal from the first signal and generate a sixth signal by cancelling the fourth interference signal from the second signal, and the combining unit may detect fourth symbols by combining the fifth signal and the sixth signal.

Here, the receiver may further include: a second quantization unit configured to quantize the second symbols output from the reliability detection unit, and provide the quantized second symbols to the maximum likelihood detection unit.

Here, the FFT unit may generate the first signal by synchronizing the received signal with a subcarrier frequency of the first transmission antenna, and generate the second signal by synchronizing the received signal with a subcarrier frequency of the second transmission antenna.

Here, the interference signal generation unit may generate the first interference signal and the second interference signal using a first estimation symbol and a second estimation symbol generated based on the first symbols, first channel information and second channel information which are channel information between the receiver and the first transmission antenna, and the receiver and the second transmission antenna, and frequency error information.

Here, the receiver may further include: a first quantization unit configured to quantize the first symbols and the second symbols output from the combining unit, and provide the quantized symbols to the interference signal generation unit.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

The invention is susceptible to various modifications and alternative forms, and specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to the accompanying drawings, exemplary embodiments of the invention will be described in detail. In order to facilitate a thorough understanding in the following description, the same reference numerals are used with reference to the same components of the drawing, and duplicate explanations for the same components will be omitted.

A method of cancelling inter-subcarrier interference in a distributed antenna system according to an embodiment of the present invention may be applied to a system using an Alamouti coded OFDM method in an cooperative communication environment of performing cooperative communication between distributed base stations or a plurality of transmission and reception points Further, in an embodiment of the present invention, 'a receiver" may be referred to as a mobile station (MS), a mobile terminal (MT), user equipment (UE), a user terminal (UT), a wireless terminal, an access terminal, a subscriber unit, a subscriber station, a wireless device, a wireless communication device, a wireless transmit/receive unit, a mobile node, a mobile, or other terms. Further, in an embodiment of the present invention, 'a transmitter' or 'a transmission antenna' may generally mean a fixed point communicating with a terminal, and may refer to terms such as a base station, a node-B, an enode-B, a base transceiver system (BTS), an access point, a transmission point, a remote radio head/remote radio equipment (RRH/RRE), etc.

Hereinafter, an example in which a method of cancelling inter-subcarrier interference of a distributed antenna system according to an embodiment of the present invention is applied to a distributed antenna system using an orthogonal frequency division multiplexing (OFDM) will be described. Further, the method of cancelling the inter-subcarrier interference according to an embodiment of the present invention may be applied to a distributed antenna system or a cooperative communication system which transmits and receives a signal using a plurality of transmission antennas and at least one reception antenna. Hereinafter, for convenience of description, an example of a distributed antenna system using two transmission antennas (or transmitters) and one reception antenna (or receiver) will be described, but the inventive concept of the present invention is not limited to the number of transmission antennas or reception antennas, and the inventive concept of the present invention may be applied to a wireless communication system comprising a plurality of transmission antennas and a plurality of reception antennas.

Figure 1:
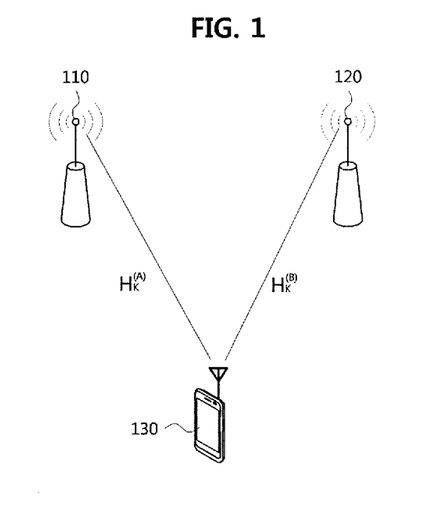
FIG. 1 is a conceptual diagram illustrating a distributed antenna communication environment in which a method of cancelling inter-subcarrier interference according to an embodiment of the present invention is applied.

FIG. 1 is a conceptual diagram illustrating a distributed antenna communication environment in which a method of cancelling inter-subcarrier interference is applied according to an embodiment of the present invention.

A method of cancelling inter-subcarrier interference according to an embodiment of the present invention may be applied to a distributed antenna environment in which there are a first transmission antenna HO, a second transmission antenna 120, and a reception antenna 130, as shown in FIG. 1. Here, each of the first transmission antenna 110 and the second transmission antenna 120 may mean a transmitter of transmitting a signal using at least one transmission antenna. Further, the reception antenna 130 may mean a receiver of including at least one reception antenna and receiving a signal transmitted through the plurality of transmission antennas.

The first transmission antenna 110 and the second transmission antenna 120 may transmit an OFDM modulated signal including a total of N subcarriers. Hereinafter, channel fading coefficients in which k-th subcarriers transmitted from the first transmission antenna 110 and the second transmission antenna 120 are going through may be represented as $H_k^{(A)}$ and $H_k^{(B)}$, respectively. An OFDM symbol period T is assumed to be long enough to ignore a time error between OFDM symbols transmitted from the first transmission antenna 110 and the second transmission antenna 120. Further, the present invention may consider a realistic environment in which there is a difference between a subcarrier frequency $f_c^{(A)}$ of a signal from the first transmission antenna 110 and a subcarrier frequency $f_c^{(B)}$ of a signal from the second transmission antenna 120 which are received by the reception antenna 130.

The method of cancelling the inter-subcarrier interference according to an embodiment of the present invention may primarily acquire an initial detection symbol from a received signal, generate an estimated interference signal based on the initial detection symbol, acquire a final detection symbol by cancelling the generated interference signal from the received signal, and cancel the inter-subcarrier interference. Further, primarily, the method of autonomously cancelling the inter-subcarrier interference component due to a frequency error may be applied in the process of acquiring the initial detection symbol.

A conventional method of cancelling the inter-subcarrier interference in the system using the Alamouti coded OFDM method may map a pair of Alamouti code symbols to adjacent two subcarriers. That is, when a first symbol transmitted from the transmission antenna is represented as $x_l$, the pair of Alamouti code symbols of temporally successive two symbols $x_l$ and $x_{l+1}$ may be mapped to $-x_{l+1}^*$ and $x_l^*$, respectively. However, such a symbol mapping method has a disadvantage in which performance of the inter-subcarrier interference cancellation operation is degraded in a frequency selective fading channel environment.

The method of cancelling the inter-subcarrier interference according to an embodiment of the present invention may use a method in which the receiver can autonomously cancel the inter-subcarrier interference when detecting the initial symbol from the received signal in the frequency selective fading channel environment.

Figure 2:
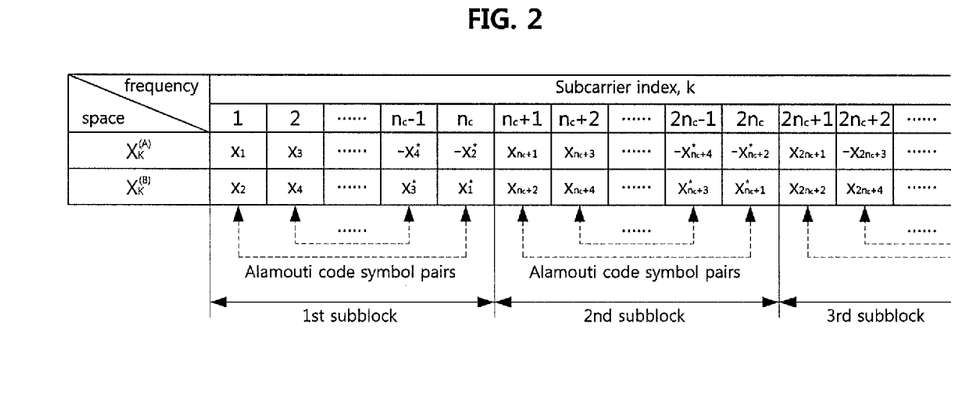
FIG. 2 is a conceptual diagram for describing an operation of mapping a pair of Alamouti code symbols performed in a transmitter in a method of cancelling inter-subcarrier interference according to an embodiment of the present invention.

FIG. 2 is a conceptual diagram for describing an operation of mapping a pair of Alamouti code symbols performed in a transmitter in a method of cancelling inter-subcarrier interference according to an embodiment of the present invention. That is, a method of mapping the pair of Alamouti code symbols for primarily cancelling interference due to a frequency error generated by a frequency selective fading in a wireless communication environment using an Alamouti coded OFDM method is illustrated as an example.

Referring to FIG. 2, the method of cancelling the inter-subcarrier interference according to an embodiment of the present invention may divide all subcarriers into a plurality of subcarrier subblocks, and map the pair of Alamouti code symbols to a corresponding subcarrier using a mirror image (or a symmetric pair) in each divided subcarrier subblock.

Specifically, when a total number of subcarriers which are available are N, first, N subcarriers may be divided into $N_b$ subcarrier subblocks. The pair of Alamouti code symbols may be selected using the mirror image with respect to each divided subcarrier subblock. Here, a mirror point (or a symmetric point) may be located in the center of the subcarriers included in each subblock, and the pair of Alamouti code symbols is mapped to the subcarriers of a symmetric location based on the mirror point in the subblock.

The number of the subblocks (or the number of subcarriers included in each subblock) may be adaptively determined according to frequency selective channel characteristics, and each transmitter may determine the number of the subblocks based on a result after determining the frequency selective channel characteristics based on channel measurement information provided from the receiver. Further, efficiency of the inter-subcarrier interference cancellation operation is large when constructing to include as many subcarriers as possible to the extent of maintaining characteristics in which a fading is flat in each subblock.

In FIG. 2, $n_c$ may mean the number of subcarriers included in each subblock. When the number of subblocks is $N_b$ (here, b means an index of the subblock), the number of the subcarriers included in each subblock $n_c$ may be calculated by $N/N_b$ (that is, $n_c=N/N_b$). Further, when the index of the subcarrier is represented as k, the index of the subblock may be calculated by $b=\lceil k/n_c \rceil$. For example, when k=17 and $n_c$=8, b=3. When $n_c$=8 and k=17, this may mean that the subcarrier is located in a third subblock.

When the pair of Alamouti code symbols $X_k^{(A)}$ and $X_k^{(B)}$ transmitted through the k-th subcarrier from each of the first transmission antenna 110 and the second transmission antenna 120 are included in a b-th subblock, the pair of Alamouti code symbols $X_k^{(A)}$ and $X_k^{(B)}$ are represented by the following Equation 1.

$$X_k^{(A)} = \qquad\qquad\qquad\qquad\qquad\qquad\text{[Equation 1]}$$
$$\begin{cases} x_{2k-(b-1)n_c-1} & \text{for } (b-1)n_c + 1 \le k \le (b-1/2)n_c \\ -x^*_{(b-1)n_c+2(bn_c-k+1)} & \text{for } (b-1/2)n_c + 1 \le k \le bn_c \end{cases}$$

$$X_k^{(B)} =$$
$$\begin{cases} x_{2k-(b-1)n_c} & \text{for } (b-1)n_c + 1 \le k \le (b-1/2)n_c \\ x^*_{(b-1)n_c+2(bn_c-k)+1} & \text{for } (b-1/2)n_c + 1 \le k \le bn_c \end{cases}$$

In Equation 1, a section $(b-1)n_c+1 \le k \le (b-\frac{1}{2})n_c$ represents a case in which the k-th subcarrier is located to the left from the center of the b-th subblock, and a section $(b-\frac{1}{2})n_c+1 \le k \le bn_c$ represents a case in which the k-th subcarrier is located to the right from the center of the b-th subblock.

As shown in FIG. 2, according to the method of cancelling the inter-subcarrier interference according to an embodiment of the present invention, the transmitter may divide all subcarriers into a plurality of subcarrier subblocks, and transmit a signal constructed by mapping the pair of Alamouti code symbols to the subcarriers using the mirror image (or the symmetric point) with respect to each divided subblock. Accordingly, a fading may be selectively shown from the point of view of the all subcarriers, but flat fading characteristics may be shown from the point of view of each of the divided subblocks. Entire subcarrier interference may be cancelled by applying the method of cancelling the interference which can be applied to the flat fading using such characteristics to each subblock.

That is, when the plurality of transmission antennas transmit a signal using the method shown in FIG. 2, the receiver may perform a fast Fourier transform (FFT) operation in synchronization with a subcarrier frequency of a signal transmitted from each transmission antenna, and perform an Alamouti linear combining operation on the signal in which the FFT operation is performed. In this operation, a portion of the inter-subcarrier interference generated due to a frequency error of the signal transmitted from each transmission antenna may be autonomously cancelled. Accordingly, the symbol in which the receiver primarily detects with respect to the received signal may have a greater accuracy than the symbol detected from the signal transmitted using the conventional Alamouti encoded OFDM method.

Figure 3:
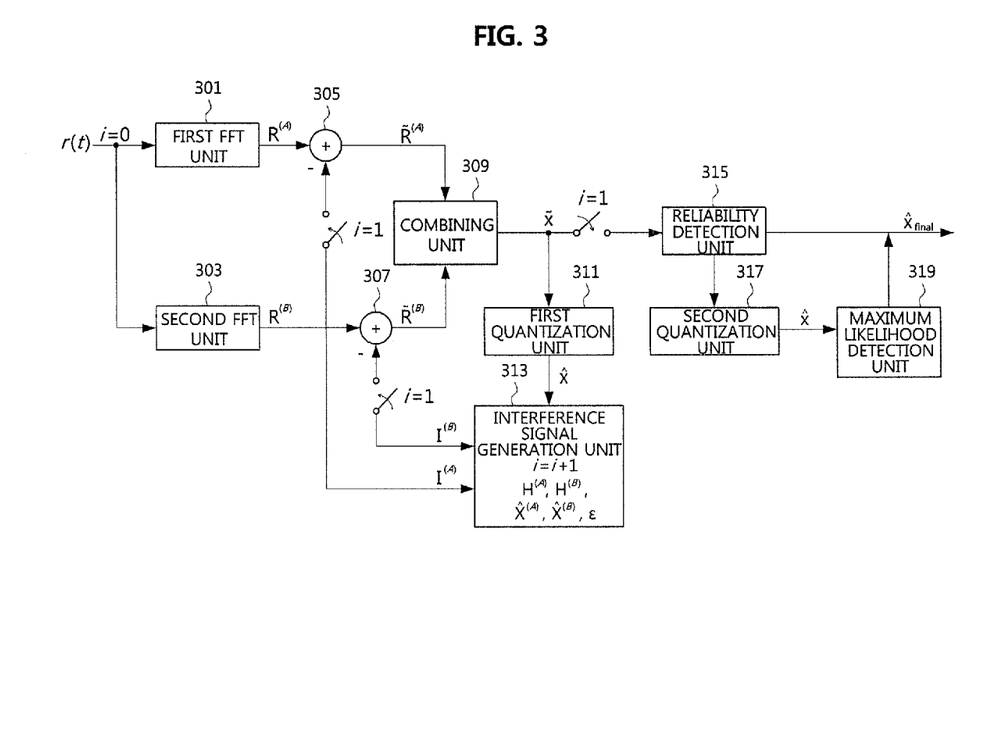
FIG. 3 is a block diagram illustrating a construction of a receiver performing a method of cancelling inter-subcarrier interference according to an embodiment of the present invention.

FIG. 3 is a block diagram illustrating a construction of a receiver performing a method of cancelling inter-subcarrier interference according to an embodiment of the present invention. FIG. 3 illustrates a construction of a receiver for cancelling inter-subcarrier interference by receiving signals transmitted from two transmission antennas as an example.

Further, in FIG. 3, for convenience of description, an example in which an inter-subcarrier interference cancellation operation is performed only once is illustrated. That is, in an initial detection symbol acquisition operation (i=0), an initial symbol in which the interference is autonomously cancelled may be primarily acquired by the construction shown in FIG. 2. After this, in a subcarrier interference cancellation operation (i=0), an interference signal may be estimated and generated based on the acquired initial detection symbol, and acquire a final detection signal by cancelling the generated interference signal from the received signal.

Meanwhile, the inventive concept of the present invention is not limited to perform the interference cancellation operation as shown in FIG. 3 only once. That is, in another embodiment of the present invention, the interference cancellation operation may be performed twice or more according to a predetermined reference.

Referring to FIG. 3, the receiver according to an embodiment of the present invention may include a first FFT unit 301, a second FFT unit 303, a first calculation unit 305, a second calculation unit 307, a combining unit 309, a first quantization unit 311, an interference signal generation unit 313, a reliability detection unit 315, a second quantization unit 317, and a maximum likelihood detection unit 319.

The first FFT unit 301 may perform the FFT operation on an input received signal r(t), and output an FFT output vector $R^{(A)}$. Here, the first FFT unit 301 may generate the FFT output vector $R^{(A)}$ having a length N by synchronizing the received signal r(t) with a subcarrier frequency $f_c^{(A)}$ of the first transmission antenna.

The second FFT unit 303 may perform the FFT operation on the input received signal r(t), and output an FFT output vector $R^{(B)}$. Here, the second FFT unit 303 may generate the FFT output vector $R^{(B)}$ having a length N by synchronizing the received signal r(t) with a subcarrier frequency $f_c^{(B)}$ of the second transmission antenna.

The output vectors $R^{(A)}$ and $R^{(B)}$ output from the first FFT unit 301 and the second FFT unit 303 may be represented by the following Equation 2, respectively.

$$R^{(A)}=[R_1^{(A)},R_2^{(A)},\ldots,R_N^{(A)}]$$

$$R^{(B)}=[R_1^{(B)},R_2^{(B)},\ldots,R_N^{(B)}] \qquad \text{[Equation 2]}$$

Further, k-th components of the output vectors $R^{(A)}$ and $R^{(B)}$, that is, k-th FFT output $R_k^{(A)}$ and $R_k^{(B)}$ may be represented by the following Equation 3, respectively.

$$R_k^{(A)} = H_k^{(A)} X_k^{(A)} + \sum_{m=1}^{N} Q(m + \epsilon - k) H_m^{(B)} X_m^{(B)} + n_k^{(A)} \quad \text{[Equation 3]}$$

$$R_k^{(B)} = H_k^{(B)} X_k^{(B)} + \sum_{m=1}^{N} Q(m - \epsilon - k) H_m^{(A)} X_m^{(A)} + n_k^{(B)}$$

In Equation 3, $\epsilon$ means a normalized frequency error (offset). When $f_\nabla(=1/T)$ defines a subcarrier spacing, the normalized frequency error $\epsilon$ may be calculated by $\epsilon=(f_c^{(A)}-f_c^{(B)})/f_\nabla$. $n_k^{(A)}$ and $n_k^{(B)}$ means noise components. $Q(d_f)$ is a function representing an inter-subcarrier interference coefficient according to a frequency difference $d_f$, and can be calculated by the following Equation 4.

$$Q(d_f) = \frac{\sin(\pi d_f)}{N\sin(\pi d_f/N)} \exp(j\pi(1 - 1/N)d_f) \quad \text{[Equation 4]}$$

Each of the first calculation unit 305 and the second calculation unit 307 may be constituted by a subtractor, and be constituted to perform a subtraction operation in the inter-subcarrier interference operation (that is, i=1). That is, in the inter-subcarrier interference operation (i=1), the first calculation unit 305 may cancel an interference signal vector $I^{(A)}$ from the FFT output vector $R^{(A)}$ output from the first FFT unit 301, and output a vector $\tilde{R}^{(A)}$ in which the interference components are cancelled. Here, the vector $\tilde{R}^{(A)}$ in which the interference components are cancelled may be provided to the combining unit 309.

Further, the second calculation unit 307 may cancel an interference signal vector $I^{(B)}$ from the FFT output vector $R^{(B)}$ output from the second FFT unit 303, and output a vector $\tilde{R}^{(B)}$ in which the interference components are cancelled. Here, the vector $\tilde{R}^{(B)}$ in which the interference components are cancelled may be provided to the combining unit 309.

Meanwhile, in the initial detection symbol acquirement operation (that is, i=0), the first calculation unit 305 and the second calculation unit 307 may not perform a subtraction operation, and the FFT output vectors $R^{(A)}$ and $R^{(B)}$ output from the first FFT unit 301 and the second FFT unit 303 may be output to the combining unit 309 as is.

That is, in an initial detection acquirement operation (that is, i=0), $\tilde{R}^{(A)}=R^{(A)}$ and $\tilde{R}^{(B)}=R^{(B)}$. In an inter-subcarrier interference cancellation operation (i=1), $\tilde{R}^{(A)}=R^{(A)}-I^{(A)}$ and $\tilde{R}^{(B)}=R^{(B)}-I^{(B)}$. Further, in the inter-subcarrier interference cancellation operation (i=1), and $\tilde{R}^{(A)}=R^{(A)}-I^{(A)}$ and $\tilde{R}^{(B)}=R^{(B)}-I^{(B)}$ may be acquired by cancelling the interference signal vectors and generated from the interference signal generation unit 313 from the FFT output vectors which are outputs of the first FFT unit 301 and the second FFT unit 303.

The combining unit 309 may perform an Alamouti combining operation on the FFT output vectors $R^{(A)}$ and $R^{(B)}$ which are output from the first FFT unit 301 and the second FFT unit 303, respectively, and detect a primary symbol vector (or the initial detection symbol) $\tilde{x}$.

Further, the combining unit 309 may perform the Alamouti combining operation on the vectors $\tilde{R}^{(A)}$ and $\tilde{R}^{(B)}$ which are provided from the first calculation unit 305 and the second calculation unit 307, respectively, and in which the interference components are cancelled, and detect a secondary symbol vector $\tilde{x}$.

The Alamouti combining operation performed in the combining unit 309 may be performed in units of a subblock. A pair of detection symbols corresponding to the pair of symbols mapped to the k-th subcarrier in the b-th subblock are represented by the following Equation 5.

$$\tilde{x}_{2k-(b-1)n_c-1} = \quad \text{Equation 5}$$

$$D_{QAM}\left[\frac{H_k^{(A)*}\tilde{R}_k^{(A)} + H_{(b-1)n_c+2(bn_c-k+1)}^{(B)}\tilde{R}_{(b-1)n_c+2(bn_c-k+1)}^{(B)*}}{|H_k^{(A)}|^2 + |H_{(b-1)n_c+2(bn_c-k+1)}^{(B)}|^2}\right]$$

for $(b-1/2)n_c + 1 \le k \le (b-1/2)n_c$ $$\tilde{x}_{2k-(b-1)n_c} =$$

$$D_{QAM}\left[\frac{H_k^{(B)}\tilde{R}_k^{(B)*} - H_{(b-1)n_c+2(bn_c-k+1)}^{(A)*}\tilde{R}_{(b-1)n_c+2(bn_c-k+1)}^{(A)}}{|H_{(b-1)n_c+2(bn_c-k+1)}^{(A)}|^2 + |H_k^{(B)}|^2}\right]$$

for $(b-1/2)n_c + 1 \le k \le (b-1/2)n_c$

In Equation 5, $D_{QAM}$ means a demodulation operator. However, the demodulation operator is not limited to a quadrature amplitude modulation (QAM) method, and various demodulation methods may be used according to a modulation method applied to the transmitter. For example, when a binary phase shift key (BPSK) method is applied to the transmitter, the demodulation operator may be constituted as $D_{BPSK}$.

The first quantization unit 311 may quantize the symbol vector $\tilde{x}$ acquired by the Equation 5, and generate the quantized symbol vector $\hat{x}$.

The interference signal generation unit 313 may estimate the Alamouti code symbols $X_k^{(A)}$ and $X_k^{(B)}$ constituted by the method as shown in FIG. 2 based on the quantized symbol vector $\hat{x}$, and generate the Alamouti symbol vectors $\hat{X}^{(A)}$ and $\hat{X}^{(B)}$.

The interference signal generation unit 313 may generate the interference signal vectors $I^{(A)}$ and $I^{(B)}$ using the channel vectors $H^{(A)}$ and $H^{(B)}$ between the first transmission antenna 110 and the receiver, and the second transmission antenna 120 and the receiver, the estimated Alamouti symbol vectors $\hat{X}^{(A)}$ and $\hat{X}^{(B)}$, and the normalized frequency error component $\epsilon$. The generated interference signal vectors $I^{(A)}$ and $I^{(B)}$ may be provided to the first calculation unit and the second calculation unit, respectively.

The k-th interference signals $I_k^{(A)}$ and $I_k^{(B)}$ among the interference signal vectors $I^{(A)}$ and $I^{(B)}$ are represented by the following Equation 6.

$$I_k^{(A)} = \begin{cases} 0 & \text{if } i = 0 \\ \sum_{m=1}^{N} Q(m+\epsilon-k)\hat{X}_m^{(B)} H_m^{(B)} & \text{if } i = 1 \end{cases} \quad \text{[Equation 6]}$$

$$I_k^{(B)} = \begin{cases} 0 & \text{if } i = 0 \\ \sum_{m=1}^{N} Q(m-\epsilon-k)\hat{X}_m^{(A)} H_m^{(A)} & \text{if } i = 1 \end{cases}$$

In Equation 6, $\hat{X}_m^{(A)}$ and $\hat{X}_m^{(B)}$ represents m-th components of $\hat{X}^{(A)}$ and $\hat{X}^{(B)}$, respectively. $H_m^{(A)}$ and $H_m^{(B)}$ represents m-th components of $H^{(A)}$ and $H^{(B)}$, respectively.

The reliability detection unit 315 may evaluate reliability with respect to the symbol vector $\tilde{x}$ provided from the combining unit 309 in the process of performing the inter-subcarrier interference cancellation operation and repeatedly performing the inter-subcarrier interference cancellation operation. The reliability detection unit 315 may calculate $\gamma_k$ which is a ratio of power of the k-the symbol vector $x_k$ with respect to average power of all the symbol vectors $\tilde{x}$ by the following Equation 7. Further, the reliability detection unit 315 may determine that the reliability is low when the calculated power ratio $\gamma_k$ is smaller than a predetermined threshold value $\gamma_0$ by comparing the calculated power ratio $\gamma_k$ with the predetermined threshold value $\gamma_0$.

$$\gamma_k = \frac{|x_k|^2}{E[|\bar{x}|^2]} \qquad \text{[Equation 7]}$$

The reliability detection unit 315 may provide the symbol vector $\tilde{x}$ to the second quantization unit 317 when it is determined that the reliability is low. Further, the reliability detection unit 315 may output the symbol vector as the final detection symbol $\hat{x}$ final when it is determined that the reliability is not low.

The second quantization unit 317 may perform a quantization operation on the symbol vector provided from the reliability detection unit 315, and generate the quantized symbol vector $\hat{x}$. The quantized symbol vector $\hat{x}$ may be provided to the maximum likelihood detection unit 319.

The maximum likelihood detection unit 319 may perform a partial maximum likelihood detection (MLD) operation on the quantized symbol vector $\hat{x}$ provided from the second quantization unit 317. That is, the maximum likelihood detection unit 319 may perform the maximum likelihood detection operation only on the symbol having low reliability among the symbols included in the quantized symbol vector $\hat{x}$, and output the detection symbol vector including the symbol detected by the maximum likelihood detection operation as the final detection symbol $\hat{x}_{final}$.

Figure 4:
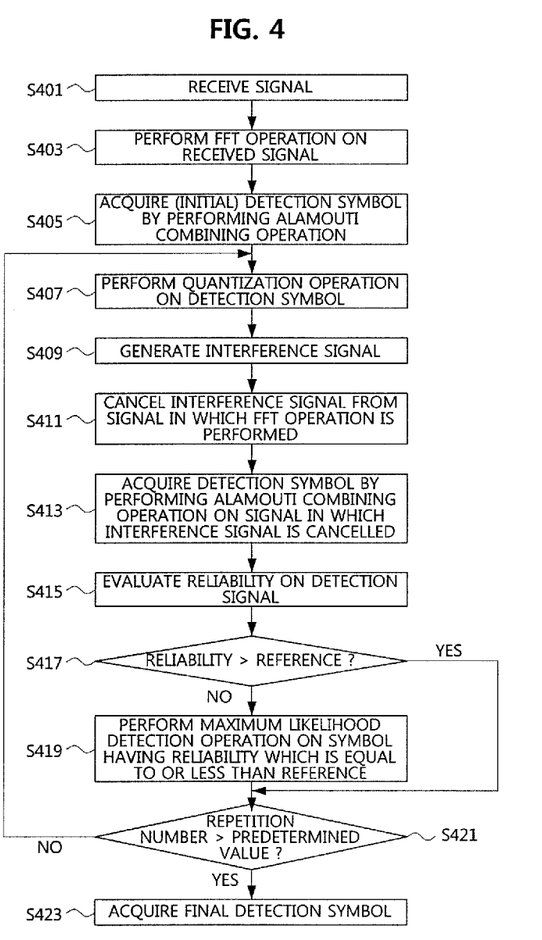
FIG. 4 is a flowchart for describing a method of cancelling inter-subcarrier interference according to an embodiment of the present invention.

FIG. 4 is a flowchart for describing a method of cancelling inter-subcarrier interference according to an embodiment of the present invention. A method of cancelling inter-subcarrier interference shown in FIG. 4 may be performed in the receiver receiving signals transmitted from two or more transmission antennas.

Referring to FIG. 4, first, the receiver may receive signals transmitted from the two transmission antennas (S401).

The receiver may generate the FFT output vectors $R^{(A)}$ and $R^{(B)}$ by performing the FFT operation on the received signal $r(t)$ in synchronization with a subcarrier frequency of the two transmission antennas (S403).

After this, the receiver may acquire the initial detection symbol $\tilde{x}$ by performing the Alamouti combining operation on the FFT output vectors $R^{(A)}$ and $R^{(B)}$ (S405). Here, since the acquired initial detection symbol $\tilde{x}$ is a symbol detected with respect to the pair of Alamouti code symbols mapped to the subcarrier with respect to each subblock using the method as shown in FIG. 2, the acquired initial detection symbol is a symbol in which a portion of the interference in each subblock is autonomously cancelled.

After this, the receiver may perform the quantization operation on the initial detection symbol $\tilde{x}$, and generate the quantized symbol vector $\hat{x}$ (S407).

The receiver may generate the pair of Alamouti symbol vectors $\hat{X}^{(A)}$ and $\hat{X}^{(B)}$ based on the quantized symbol vector $\hat{x}$, and generate the interference signal vectors $I^{(A)}$ and $I^{(B)}$ using the generated Alamouti symbol vectors $\hat{X}^{(A)}$ and $\hat{x}^{(B)}$, the channel vectors $H^{(A)}$ and $H^{(B)}$, and the normalized frequency error component $\epsilon$ (S409).

The receiver may perform a subtraction operation between the FFT output vectors $R^{(A)}$ and $R^{(B)}$ and the interference signal vectors $I^{(A)}$ and $I^{(B)}$ and cancel the interference signal from a signal in which the FFT operation is performed (S411). Here, the vectors in which the interference signal is cancelled may be $\tilde{R}^{(A)}$ and $\tilde{R}^{(B)}$.

After this, the receiver may perform the Alamouti combining operation on the vectors $\tilde{R}^{(A)}$ and $\tilde{R}^{(B)}$ in which the interference signal is cancelled, and acquire the symbol vector $\tilde{x}$ (S413).

After this, the receiver may evaluate reliability on the acquired symbol vector $\tilde{x}$ (S415), and compare the evaluated reliability with a predetermined reference (S417). Here, when the reliability is lower than the predetermined reference, the quantization operation may be performed on the symbol vector $\tilde{x}$, and the maximum likelihood detection operation may be partially performed only on a symbol in which the reliability is lower than the predetermined reference (S419).

Here, the receiver may repeatedly perform the operations S407 to S419 by the repetition number $i_{count}$, which are predetermined, of the inter-subcarrier interference cancellation operations, and acquire the final detection symbol $\hat{x}_{final}$ after performing the repetition number of the inter-subcarrier interference cancellation operations. Here, the repetition number may be set according to various conditions such as the number of transmission antennas, selective fading information, and performance of the receiver, etc.

Figure 5:
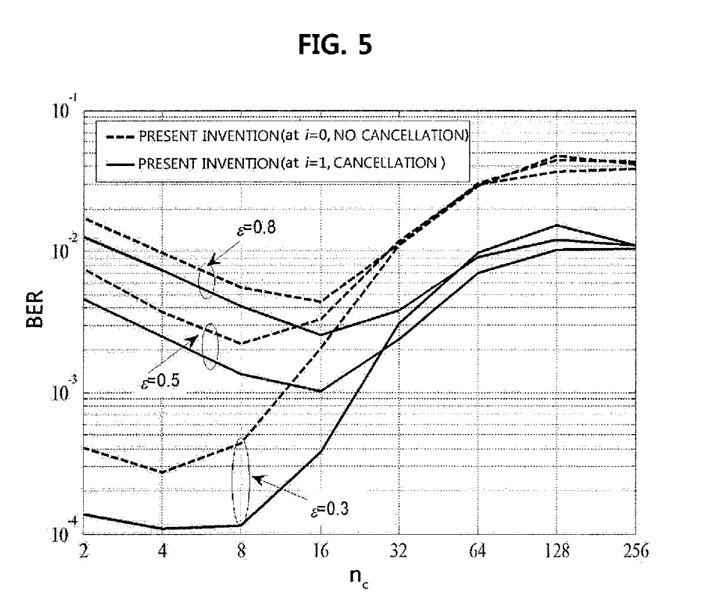
FIG. 5 is a graph illustrating a result of measuring performance of a method of cancelling inter-subcarrier interference according to the number of subcarriers included in each subblock according to an embodiment of the present invention.

FIG. 5 is a graph illustrating a result of measuring performance of a method of cancelling inter-subcarrier interference according to the number of subcarriers included in each subblock according to an embodiment of the present invention.

In FIG. 5, a horizontal axis represents the number of subcarriers, a vertical axis represents a bit error rate (BER). Further, a dashed line represents a case in which the interference signal is not cancelled from the received signal (that is, i=0), and a solid line represents a case in which the interference signal is cancelled from the received signal by performing the method of cancelling the inter-subcarrier interference (that is, i=1).

Referring to FIG. 5, as the normalized frequency error (normalized F0, $\epsilon$) is lower, BER performance is better. Further, when performing the method of cancelling the inter-subcarrier interference at the same frequency error, that is, a case of cancelling the interference signal from the received signal (i=1) may have a better BER performance than a case of not cancelling the interference signal from the received signal (i=0).

Meanwhile, when the frequency errors are 0.8 and 0.5, respectively, the BER performance is improved according to an increase in the number of subcarriers included in each subblock to 16 or less, and when the frequency error is 0.3, the BER performance is improved according to an increase of the number of subcarriers included in each subblock to 8 or less.

Figure 6:
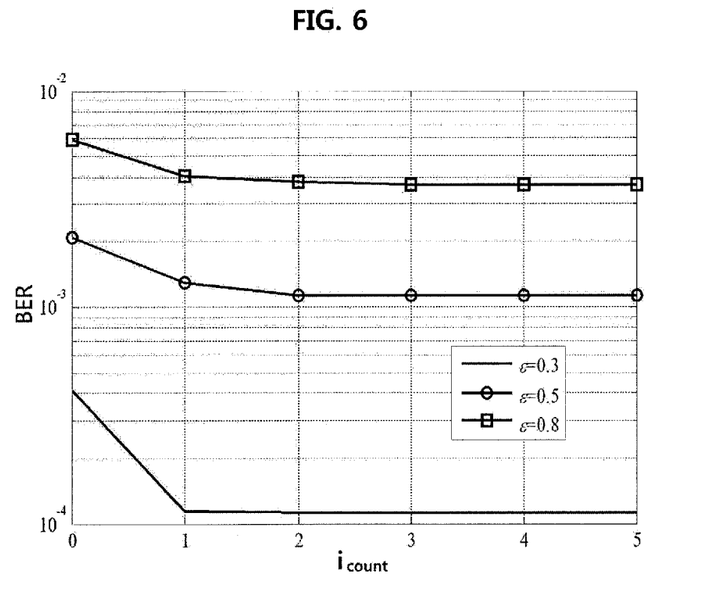
FIG. 6 is a graph illustrating a result of measuring performance of a method of cancelling inter-subcarrier interference according to the number of inter-subcarrier interference cancellation operations according to an embodiment of the present invention.

FIG. 6 is a graph illustrating a result of measuring performance of a method of cancelling inter-subcarrier interference according to the number of inter-subcarrier interference cancellation operations according to an embodiment of the present invention.

In FIG. 6, a horizontal axis represents the repetition number of the inter-subcarrier interference cancellation operations included in the method of cancelling inter-subcarrier interference according to an embodiment of the present invention, and a vertical axis represents a BER.

Referring to FIG. 6, the lower the normalized frequency error c is, the more BER performance is improved.

Further, in the same frequency error, the more the repetition number of the inter-subcarrier interference cancellation operations is increased, the more BER performance is better. Although there is a little difference according to the normalized frequency error, the BER performance can be gently improved when the repetition number of the inter-subcarrier interference cancellation operations is one or more.

Accordingly, the repetition number of the inter-subcarrier interference cancellation operations has to be properly set by considering a tradeoff relation between an amount of calculations and detection performance of the receiver.

Figure 7:
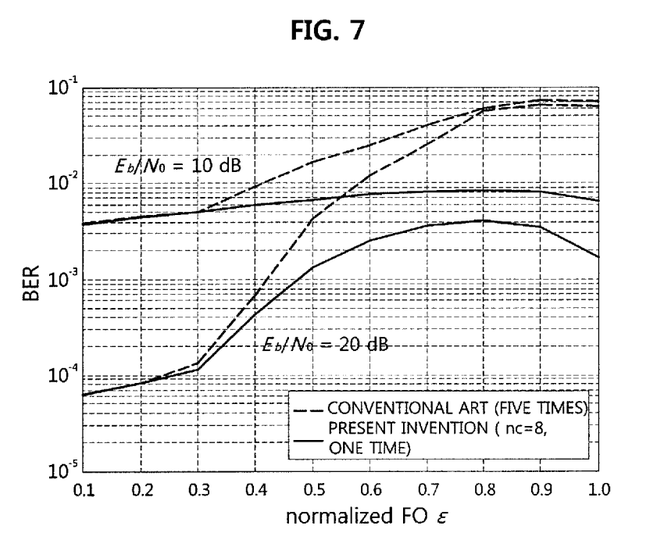
FIG. 7 is a graph illustrating a comparison of performances of a method of cancelling inter-subcarrier interference according to an embodiment of the present invention and a conventional method according to the number of cancelling inter-subcarrier interference operations.

FIG. 7 is a graph illustrating a comparison of performances of a method of cancelling inter-subcarrier interference according to an embodiment of the present invention and a conventional method.

In FIG. 7, a horizontal axis represents the normalized frequency error $\epsilon$, and a vertical axis represents a BER.

Referring to FIG. 7, when $E_b/N_o$ is 10 dB, as the frequency error increases, the BER performance of a case in which the method of cancelling the inter-subcarrier interference is performed one time according to an embodiment of the present invention may be better than the BER performance of a case in which the conventional inter-subcarrier interference cancellation method is repeatedly performed five times.

Further, the BER performance when $E_b/N_o$ is 20 dB is better than the BER performance when $E_b/N_o$ is 10 dB, and specifically, the BER performance of the method of cancelling the inter-subcarrier interference according to an embodiment of the present invention is measured to be better than the BER performance of the conventional inter-subcarrier interference cancellation method.

While the example embodiments of the present invention and their advantages have been described in detail, it should be understood that various changes, substitutions and alterations may be made herein without departing from the scope of the invention.

What is claimed is:

1. A method of cancelling inter-subcarrier interference, comprising:
    generating a first signal and a second signal by performing a fast Fourier transform (FFT) operation on a signal received from a first transmission antenna and a second transmission antenna;
    acquiring first symbols by combining the first signal and the second signal;
    generating a first interference signal and a second interference signal based on the first symbols;
    generating a third signal by cancelling the first interference signal from the first signal, and generating a fourth signal by cancelling the second interference signal from the second signal; and
    acquiring second symbols by combining the third signal and the fourth signal.

2. The method of cancelling the inter-subcarrier interference of claim 1, when each of the first transmission antenna and the second transmission antenna divides available all subcarriers into a plurality of subcarrier subblocks,
    wherein the received signal is constituted as a pair of Alamouti code symbols generated by mapping input symbols to subcarriers included in the each of the plurality of subblocks.

3. The method of cancelling the inter-subcarrier interference of claim 1, further comprising:
    evaluating reliability with respect to the second symbols; and
    acquiring third symbols by performing a maximum likelihood detection operation on a symbol in which the evaluated reliability is lower than a predetermined reference.

4. The method of cancelling the inter-subcarrier interference of claim 3, wherein the evaluating of the reliability with respect to the second symbols evaluates the reliability based on a result obtained by comparing a ratio of average power of all the second symbols and power of each symbol included in the second symbols with a predetermined threshold value.

5. The method of cancelling the inter-subcarrier interference of claim 3, further comprising:
    generating a third interference signal and a fourth interference signal based on the third symbols;
    generating a fifth signal by cancelling the third interference signal from the first signal, and generating a sixth signal by cancelling the fourth interference signal from the second signal; and
    acquiring fourth symbols by combining the fifth signal and the sixth signal.

6. The method of cancelling the inter-subcarrier interference of claim 1, wherein the generating of the first signal and the second signal generates the first signal by synchronizing the received signal with a subcarrier frequency of the first transmission antenna, and generates the second signal by synchronizing the received signal with a subcarrier frequency of the second transmission antenna.

7. The method of cancelling the inter-subcarrier interference of claim 1, wherein the generating of the first interference signal and the second interference signal generates the first interference signal and the second interference signal using a first estimation symbol and a second estimation symbol generated based on the first symbols, first channel information and second channel information which are channel information between the receiver and the first transmission antenna, and the receiver and the second transmission antenna, and frequency error information.

8. A receiver, comprising:
    a FFT unit configured to perform a FFT operation on a signal received from a first transmission antenna and a second transmission antenna, and generate a first signal and a second signal;
    a calculation unit configured to provide the first signal and the second signal;
    a combining unit configured to detect first symbols by combining the first and the second signals; and
    an interference signal generation unit configured to generate a first interference signal and a second interference signal based on the first symbols,
    wherein the calculation unit generates a third signal and a fourth signal by cancelling the first interference signal and the second interference signal from the first signal and the second signal, respectively, and the combining unit detects second symbols by combining the third signal and the fourth signal.

9. The receiver of claim 8, when each of the first transmission antenna and the second transmission antenna divides available all subcarriers into a plurality of subcarrier subblocks,
    wherein the received signal is constituted as a pair of Alamouti code symbols generated by mapping input symbols to subcarriers included in the each of the plurality of subblocks.

10. The receiver of claim 8, further comprising:
    a reliability detection unit configured to evaluate reliability with respect to the second symbols; and
    a maximum likelihood detection unit configured to detect third symbols by performing a maximum likelihood detection operation on a symbol in which the evaluated reliability is lower than a predetermined reference.

11. The receiver of claim 10, wherein the reliability detection unit evaluates the reliability based on a result obtained by comparing a ratio of average power of all the second symbols and power of each symbol included in the second symbols with a predetermined threshold value.

12. The receiver of claim 11, wherein the interference signal generation unit generates a third interference signal and a fourth interference signal based on the third symbols, the calculation unit generates a fifth signal by cancelling the third interference signal from the first signal and generates a sixth signal by cancelling the fourth interference signal from the second signal, and the combining unit detects fourth symbols by combining the fifth signal and the sixth signal.

13. The receiver of claim 11, further comprising:
a second quantization unit configured to quantize the second symbols output from the reliability detection unit, and provide the quantized second symbols to the maximum likelihood detection unit.

14. The receiver of claim 8, wherein the FFT unit generates the first signal by synchronizing the received signal with a subcarrier frequency of the first transmission antenna, and generates the second signal by synchronizing the received signal with a subcarrier frequency of the second transmission antenna.

15. The receiver of claim 8, wherein the interference signal generation unit generates the first interference signal and the second interference signal using a first estimation symbol and a second estimation symbol generated based on the first symbols, first channel information and second channel information which are channel information between the receiver and the first transmission antenna, and the receiver and the second transmission antenna, and frequency error information.

16. The receiver of claim 8, further comprising:
a first quantization unit configured to quantize the first symbols and the second symbols output from the combining unit, and provide the quantized symbols to the interference signal generation unit.

* * * * *